(12) United States Patent
Hagihara

(10) Patent No.: US 11,099,702 B2
(45) Date of Patent: Aug. 24, 2021

(54) TOUCHSCREEN AND METHOD OF MANUFACTURING TOUCHSCREEN

(71) Applicant: FUJITSU COMPONENT LIMITED, Tokyo (JP)

(72) Inventor: Hideyuki Hagihara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/412,176

(22) Filed: Jan. 23, 2017

(65) Prior Publication Data
US 2017/0228073 A1 Aug. 10, 2017

(30) Foreign Application Priority Data
Feb. 5, 2016 (JP) .............................. JP2016-020622

(51) Int. Cl.
*G06F 3/041* (2006.01)
*G06F 3/045* (2006.01)

(52) U.S. Cl.
CPC .......... *G06F 3/045* (2013.01); *G06F 3/04164* (2019.05); *G06F 2203/04103* (2013.01)

(58) Field of Classification Search
CPC .......... G06F 3/041; G06F 3/044; G06F 3/045; G06F 3/043; G06F 3/047; H01L 21/30; H01L 21/46; H01L 21/84; H01L 29/04; H01L 27/32; H01L 51/56; G02F 1/1333; G02F 1/1335; G02B 5/08; G02B 27/00; G02B 21/00; G02B 17/00; G02B 23/16; H04M 1/00; G08C 21/00; H01R 43/00; G08G 21/00; H03M 11/00; G09G 5/00; G09G 5/08; H05K 1/00; H05K 1/02; H05K 1/09; H05K 3/10; H05K 3/12; H05K 3/42;
(Continued)

(56) References Cited

U.S. PATENT DOCUMENTS 6,304,251 B1 * 10/2001 Ito .......................... G06F 3/045
178/18.01
7,538,288 B1 * 5/2009 Huang .................... G06F 3/045
200/512
(Continued)

FOREIGN PATENT DOCUMENTS

EP 2163971 3/2010
JP H07-076131 3/1995
(Continued)

*Primary Examiner* — Chanh D Nguyen
*Assistant Examiner* — Nguyen H Truong
(74) *Attorney, Agent, or Firm* — IPUSA, PLLC

(57) ABSTRACT

A touchscreen includes a first substrate, a second substrate, an adhesive, a first wiring layer, a second wiring layer, a through hole, and an electrically conductive adhesive. The first substrate includes a first transparent conductive film formed at a surface of the first substrate. The second substrate includes a second transparent conductive film formed at a surface of the second substrate. The adhesive adheres the first and second substrates to each other. The first wiring layer is formed on the surface of the first substrate. The second wiring layer is formed on the surface of the second substrate. The through hole pierces through the second substrate. The electrically conductive adhesive is provided in the through hole, and connects the first wiring layer and the second wiring layer.

6 Claims, 16 Drawing Sheets

(58) Field of Classification Search
CPC .......... H05K 7/06; B32B 38/04; B32B 37/02; B32B 37/24; H01H 1/10; H01H 11/00
See application file for complete search history.

(56) References Cited

U.S. PATENT DOCUMENTS

| | | | |
|---|---|---|---|
| 2002/0000979 A1* | 1/2002 | Furuhashi | G06F 3/045 345/173 |
| 2005/0046622 A1* | 3/2005 | Nakanishi | G06F 3/045 345/173 |
| 2011/0043465 A1* | 2/2011 | Huang | G06F 3/045 345/173 |
| 2011/0122090 A1* | 5/2011 | Suetomi | G06F 3/045 345/174 |
| 2011/0175841 A1 | 7/2011 | Nakamura et al. | |
| 2011/0234506 A1* | 9/2011 | Kim | G06F 3/044 345/173 |
| 2012/0073866 A1* | 3/2012 | Hirai | G06F 3/044 174/257 |
| 2016/0070396 A1* | 3/2016 | Horade | G06F 3/044 345/174 |

FOREIGN PATENT DOCUMENTS

| | | | | |
|---|---|---|---|---|
| JP | H09-330176 | 12/1997 | | |
| JP | 2012014206 A | * | 1/2012 | .............. G06F 3/041 |
| WO | 2011/010378 | 1/2011 | | |

* cited by examiner

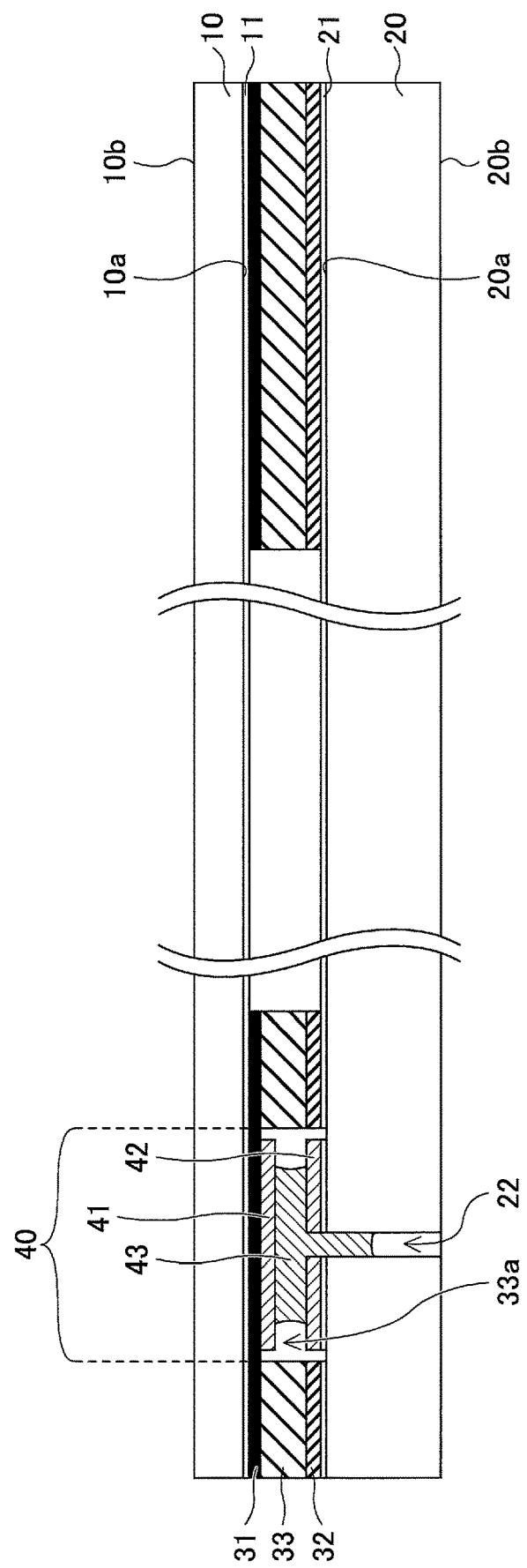

TOUCHSCREEN AND METHOD OF MANUFACTURING TOUCHSCREEN

CROSS-REFERENCE TO RELATED APPLICATION

The present application is based upon and claims the benefit of priority of Japanese Patent Application No. 2016-020622, filed on Feb. 5, 2016, the entire contents of which are incorporated herein by reference.

BACKGROUND OF THE INVENTION

1. Field of the Invention

The present invention relates to touchscreens and methods of manufacturing a touchscreen.

2. Description of the Related Art

Touchscreens installed on a display unit and operable with a finger or stylus touch are prevalent. Touchscreens include capacitive touchscreens and resistive touchscreens.

The resistive touchscreen includes an upper substrate and a lower substrate each of which has a transparent conductive film formed on its surface. The upper substrate and the lower substrate are provided with their transparent conductive films facing each other with a gap between the transparent conductive films.

According to the resistive touchscreen, the upper substrate is pressed to flex to bring the transparent conductive films of the upper and lower substrates into contact. A voltage is applied to one of the transparent conductive films to generate a potential distribution, and a potential at a point of contact is detected by the other of the transparent conductive films.

For related art, reference may be made to Japanese Laid-Open Patent Application Nos. 7-76131 and 9-330176.

SUMMARY OF THE INVENTION

According to an aspect of the present invention, a touchscreen includes a first substrate, a second substrate, an adhesive, a first wiring layer, a second wiring layer, a through hole, and an electrically conductive adhesive. The first substrate includes a first transparent conductive film formed at a surface of the first substrate. The second substrate includes a second transparent conductive film formed at a surface of the second substrate. The adhesive adheres the first and second substrates to each other. The first wiring layer is formed on the surface of the first substrate. The second wiring layer is formed on the surface of the second substrate. The through hole pierces through the second substrate. The electrically conductive adhesive is provided in the through hole, and connects the first wiring layer and the second wiring layer.

According to an aspect of the present invention, a touchscreen includes a first substrate, a second substrate, an adhesive, a wiring layer, a wiring, an electrically conductive adhesive, and a via. The first substrate includes a first transparent conductive film formed at a surface of the first substrate. The second substrate includes a second transparent conductive film formed at a first surface of the second substrate. The adhesive adheres the first and second substrates to each other. The wiring layer is formed on the surface of the first substrate. The wiring includes a first wiring formed on the first surface of the second substrate and a second wiring formed on a second surface of the second substrate opposite to the first surface. The electrically conductive adhesive connects the wiring layer and the wiring. The via pierces through the second substrate, and connects the first wiring and the second wiring.

According to an aspect of the present invention, a method of manufacturing a touchscreen includes sticking a first surface of a first substrate and a second surface of a second substrate together with an adhesive, with a first transparent conductive film formed at the first surface and a second transparent conductive film formed at the second surface facing toward each other. An electrically conductive adhesive is supplied through a through hole piercing through the second substrate for electrically connecting a first wiring layer on the first surface and a second wiring layer on the second surface. The through hole is formed in a region of the second substrate on which the second wiring layer is formed.

BRIEF DESCRIPTION OF THE DRAWINGS

FIG. 6 is a cross-sectional view of the touchscreen according to the first embodiment;

DESCRIPTION OF THE EMBODIMENTS

Figure 1:
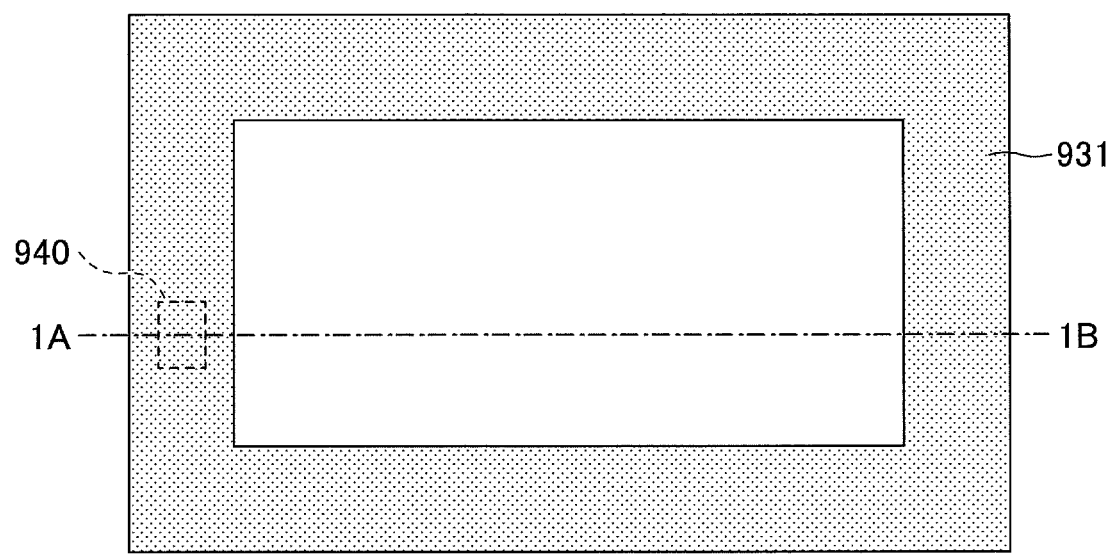
FIG. 1 is a plan view of a touchscreen.

Recently, capacitive touchscreens focusing on flatness and design have dominated the marketplace. Therefore, there is a demand for flat, design-conscious resistive touchscreens as well. Furthermore, when touchscreens are equal in size, those with a greater operation area are preferred.

According to an aspect of the present invention, it is possible to improve the quality and functionality of resistive touchscreens.

Embodiments of the present invention are described below. The same element or member is referred to using the same reference numeral, and a repetitive description thereof is omitted.

[a] First Embodiment

Figure 2:
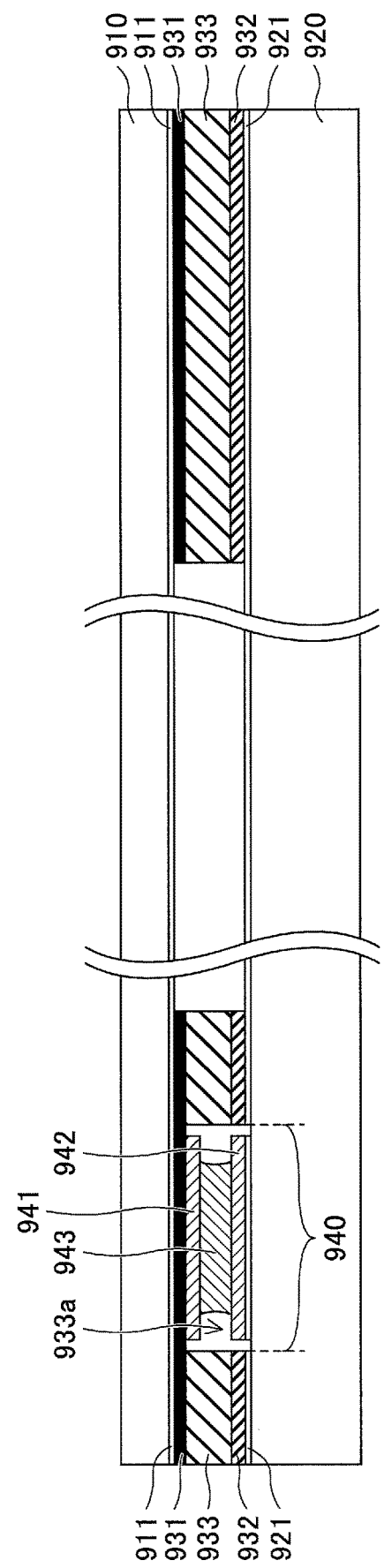
FIG. 2 is a cross-sectional view of part of the touchscreen.

A resistive touchscreen (hereinafter referred to as "touchscreen") is described with reference to FIGS. 1 and 2. FIG. 1 is a plan view of the touchscreen. FIG. 2 is a cross-sectional view of the touchscreen taken along the chain line 1A-1B of FIG. 1. The touchscreen includes an upper substrate 910 and a lower substrate 920. A transparent conductive film 911 is formed on one surface of the upper substrate 910. A transparent conductive film 921 is formed on one surface of the lower substrate 920. A decorative printing layer 931 is formed on a marginal area of the conductive film 911. In this specification, a marginal area of a substrate or film refers to an area along the four sides or perimeter of the substrate or film. An insulator layer 932 is formed on a marginal area of the conductive film 921. The upper substrate 910 and the lower substrate 920 are stuck together with an adhesive 933 provided between the printing layer 931 and the insulator layer 932 with the conductive films 911 and 921 facing toward each other. The touchscreens described below basically have the same configuration as described above.

The upper substrate 910 is formed of a film of a transparent resin material, and is flexible.

The conductive films 911 and 921 are formed of, for example, indium tin oxide (ITO). The printing layer 931 is formed of, for example, a black paint printed on the upper substrate 910. The adhesive 933, a wiring layer 941, a wiring layer 942, and an electrically conductive adhesive 943 are covered with the printing layer 931 to be invisible from the upper substrate 910 side.

Referring to FIG. 2, an opening 933a for forming a wiring connection region 940 is formed in the adhesive 933. The wiring layer 941 and the wiring layer 942 are connected with the adhesive 943 in the wiring connection region 940.

Figure 3:
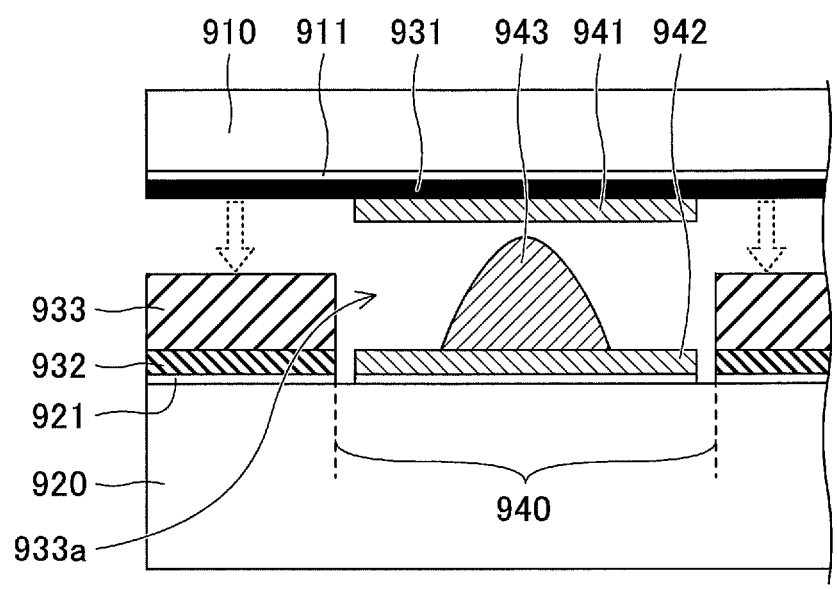
FIG. 3 is a diagram illustrating a wiring connection region of the touchscreen.

FIG. 3 is a diagram illustrating the wiring connection region 940. When manufacturing the touchscreen, first, as depicted in FIG. 3, the adhesive 933 is adhered onto the insulator layer 932. Next, the adhesive 943 is supplied onto the wiring layer 942 in the opening 933a, namely, the wiring connection region 940. Then, the surface of the upper substrate over which the printing layer 931 is formed is adhered onto the adhesive 933. At this point, the wiring layer 941 and the wiring layer 942 are connected by the adhesive 943.

The adhesive 943 is supplied onto the wiring layer 942 through a needle provided on a dispenser or the like. The viscosity of the adhesive 943, however, changes as the ambient temperature or humidity changes. Therefore, the amount of the adhesive 943 supplied onto the wiring layer 942 is likely to vary. Furthermore, the amount of supply of the adhesive 943 changes when the tip of the needle is clogged as well.

Figure 4A:
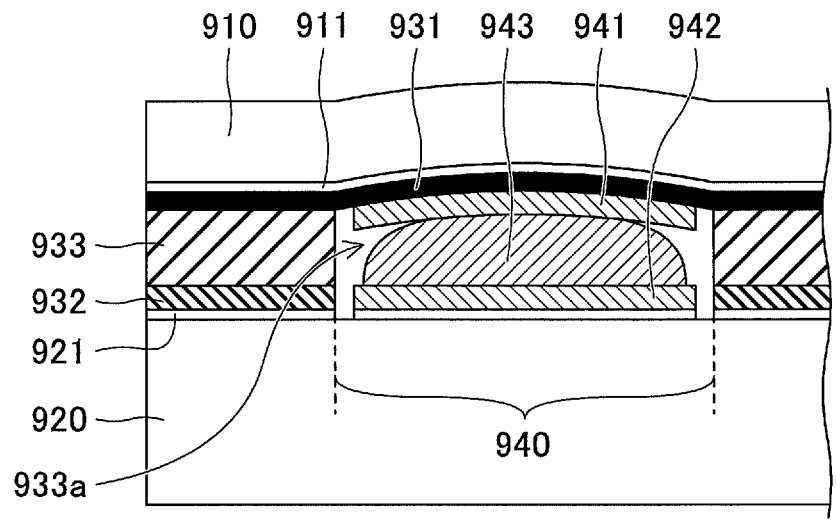
FIGS. 4A and 4B are diagrams illustrating the wiring connection region of the touchscreen.
Figure 4B:
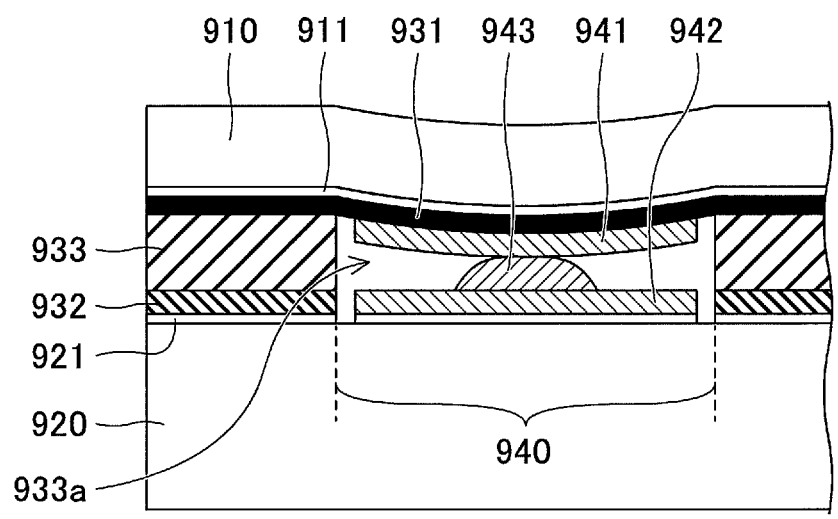

FIG. 4A illustrates the case where the adhesive 943 is oversupplied onto the wiring layer 942. In this case, when the upper substrate 910 is adhered to the adhesive 933, the upper substrate 910 is pressed by the adhesive 943 to convexly flex. In contrast, FIG. 4B illustrates the case where the adhesive 943 is undersupplied onto the wiring layer 942. In this case, when the upper substrate 910 is adhered to the adhesive 933, the upper substrate 910 is pulled by the adhesive 943 to concavely flex. The upper substrate 910 is formed so thin as to flex when contacted by a finger or the like. Therefore, even a slight variation in the amount of supply of the adhesive 943 would cause a flexure of the upper substrate 910 to make the surface of the touchscreen uneven.

Because the printing layer 931 is formed over the upper substrate 910, the wiring connection region 940 where the wiring layers 941 and 942 are connected by the adhesive 943 is covered with the printing layer 931. Accordingly, the wiring connection region 940 is not directly viewed. When the upper substrate 910 flexes in the wiring connection region 940, however, a surface of the upper substrate 910 to serve as the surface of the touchscreen becomes uneven. In this case, the surface of the touchscreen is not flat, thus impairing the aesthetic appearance of the touchscreen to give the impression of a touchscreen of poor quality.

Figure 5:
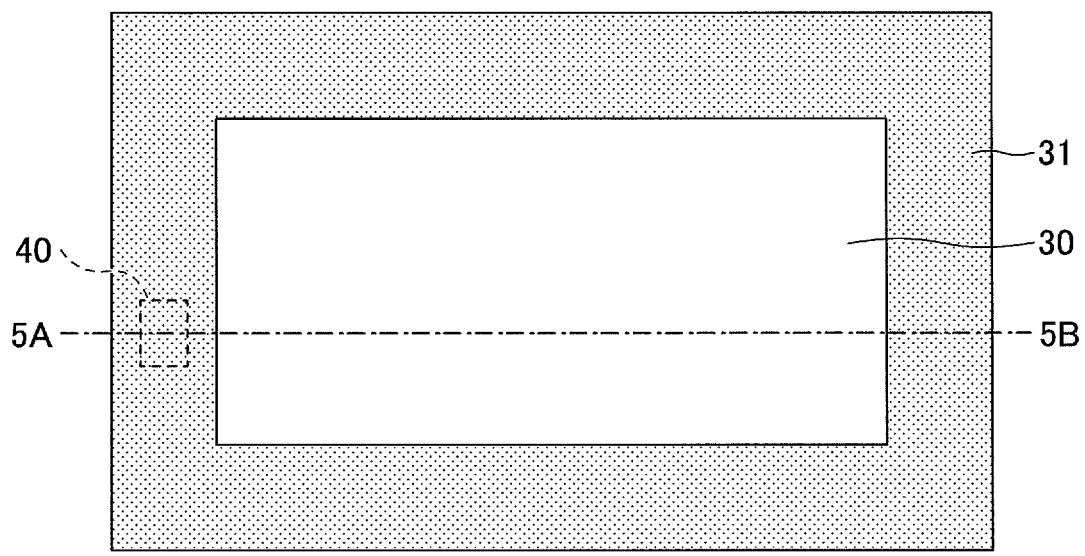
FIG. 5 is a plan view of a touchscreen according to a first embodiment.

Next, a touchscreen according to this embodiment is described with reference to FIGS. 5 and 6. FIG. 5 is a plan view of the touchscreen. FIG. 6 is a cross-sectional view of the touchscreen taken along the chain line 5A-5B of FIG. 5.

The touchscreen includes an upper substrate 10 and a lower substrate 20. A transparent conductive film 11 is formed on a first surface 10a of the upper substrate 10. A transparent conductive film 21 is formed on a first surface 20a of the lower substrate 20. The upper substrate 10 may be referred to as "first substrate" and the lower substrate 20 may be referred to as "second substrate."

A decorative printing layer 31 is formed on a marginal area of the conductive film 11. An insulator layer 32 is formed on a marginal area of the conductive film 21. The upper substrate 10 and the lower substrate 20 are stuck together with an adhesive 33 provided between the printing layer 31 and the insulator layer 32 with the conductive films 11 and 21 facing toward each other. A gap commensurate with the thickness of the adhesive 33 is formed between the conductive films 11 and 21. The region inside the printing layer 31 is a transparent region 30.

Furthermore, an opening 33a for forming a wiring connection region 40 is formed in the adhesive 33. A wiring layer 41 formed over a marginal area of the upper substrate 10 and a wiring layer 42 formed over a marginal area of the lower substrate 20 are connected with an electrically conductive adhesive 43. A through hole 22 piercing through the lower substrate 20 is formed in a region of the lower substrate 20 over which the wiring layer 42 is formed, immediately below the wiring layer 42 in FIG. 6. The adhesive 43 is supplied into the wiring connection region 40 between the wiring layer 41 and the wiring layer 42 through the through hole 22. Thus, the wiring layers 41 and 42 are connected by the adhesive 43 in the wiring connection region 40.

The upper substrate 10 is formed of a film of a transparent resin material, and is flexible. The lower substrate 20 is formed of a transparent material such as glass or a transparent resin material, and is thicker than the upper substrate 10.

The conductive films 11 and 21 are formed of, for example, ITO. The printing layer 31 is formed of, for example, a black paint printed over the marginal area of the upper substrate 10. The adhesive 33, the wiring layers 41 and 42, and the adhesive 43 are covered with the printing layer 31 to be invisible from the upper substrate 10 side, namely, the touchscreen surface side. Accordingly, the touchscreen has a better aesthetic appearance.

Next, a method of manufacturing a touchscreen according to this embodiment is described with reference to FIGS. 7A through 7C.

Figure 7A:
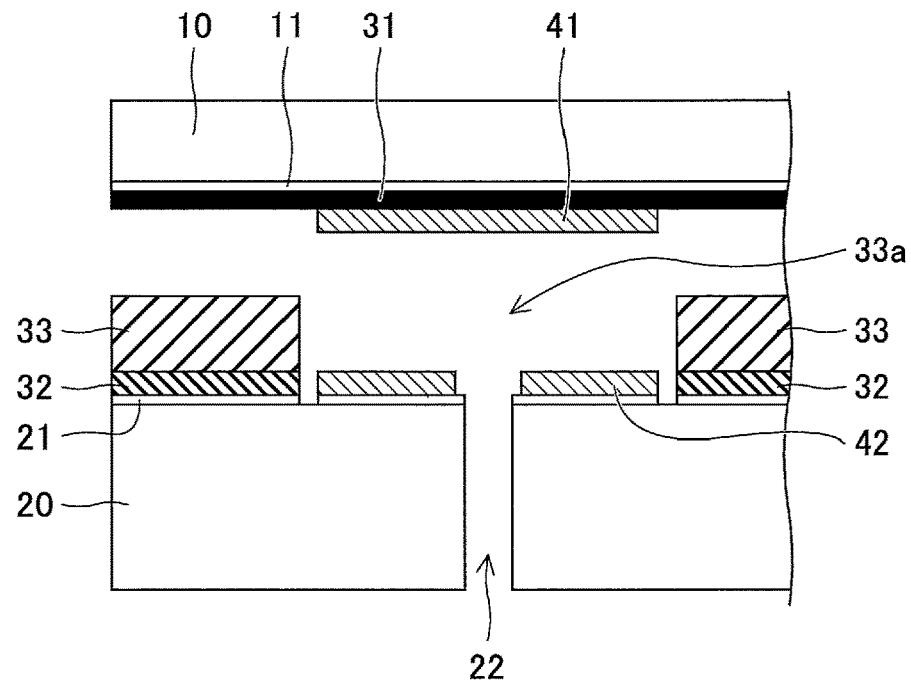
FIGS. 7A through 7C are diagrams illustrating the touchscreen according to the first embodiment.

First, as depicted in FIG. 7A, the adhesive 33 is adhered onto the insulator layer 32. The adhesive 33 is formed of, for example, double-sided tape, and the opening 33a for forming the wiring connection region 40 is formed in the adhesive 33. In the wiring connection region 40, the wiring layer 42 is formed on the conductive film 21. The through hole 22 piercing through the lower substrate 20 is formed in a region of the lower substrate 20 over which the wiring layer 42 is formed. The through hole 22 is formed by a process such as laser processing or ultrasonic processing. The printing layer 31 is formed on the marginal area of the conductive film 11, and the wiring layer 41 to connect to the wiring layer 42 is formed in the wiring connection region 40.

Figure 7B:
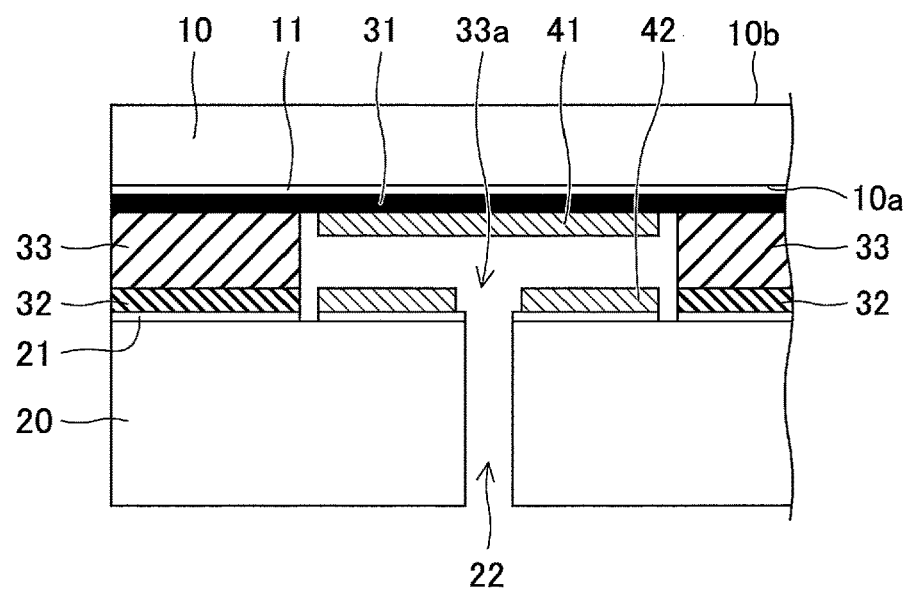

Next, as depicted in FIG. 7B, the first surface 10a of the upper substrate 10 over which the printing layer 31 is formed is adhered onto the adhesive 33 through the printing layer 31.

Figure 7C:
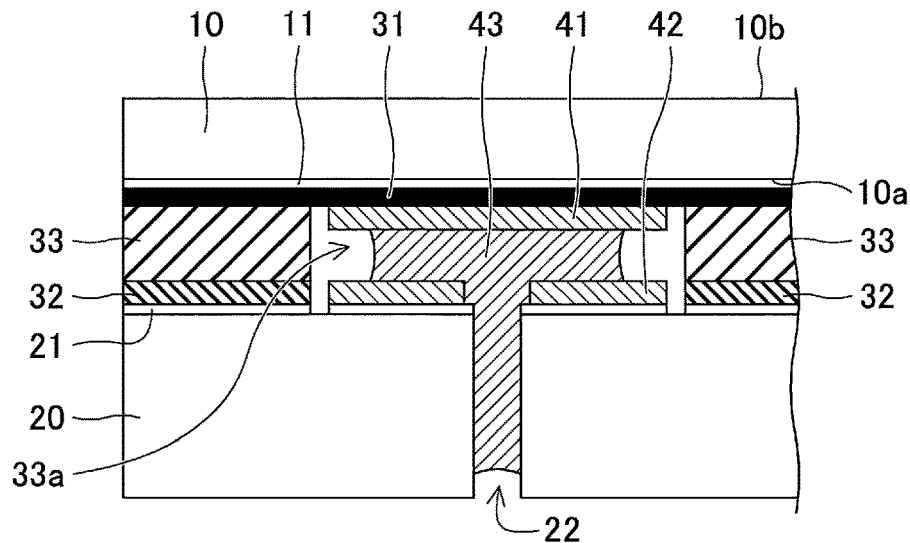

Next, as depicted in FIG. 7C, the adhesive 43 is supplied into the opening 33a through the through hole 22. The wiring layers 41 and 42 are connected by the supplied adhesive 43. The adhesive 43 is an adhesive containing silver or copper particulates, such as silver paste.

According to this embodiment, the adhesive 43 is supplied into the opening 33a through the through hole 22 after the upper and lower substrates 10 and 20 are stuck together.

According to this embodiment, a second surface 10b of the upper substrate 10 is kept flat because the adhesive 43 is supplied into the opening 33a through the through hole 22 with the upper and lower substrates 10 and 20 stuck together.

Figure 8:
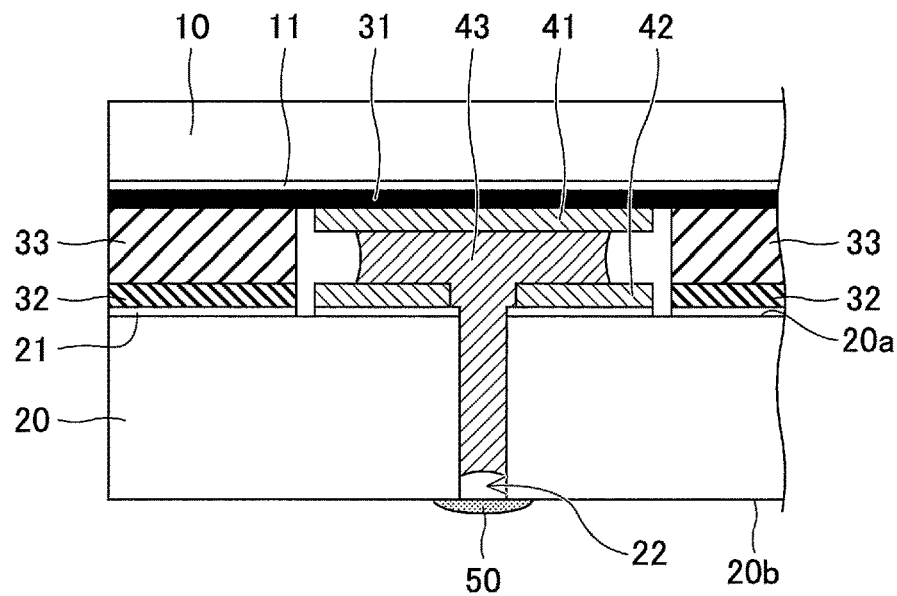
FIG. 8 is a diagram illustrating the touchscreen according to the first embodiment.

Thereafter, a sealing 50 may be provided on a second surface 20b of the lower substrate 20 to close the through hole 22 as depicted in FIG. 8. As a result, it is possible to isolate the adhesive 43 from outside air. The adhesive 43 may change its properties because of humidity or the like. By closing the through hole 22 with the sealing 50, however, it is possible to isolate the adhesive 43 from outside air to prevent a change in the properties of the adhesive 43. Furthermore, when the lower substrate 20 is formed of glass or the like, the strength of the lower substrate 20 is reduced around the through hole 22. Therefore, by closing the through hole 22 with the sealing 50, it is possible to suppress reduction in the strength of the lower substrate 20. Suitable materials for the sealing 50 include, for example, silicone.

Figure 9:
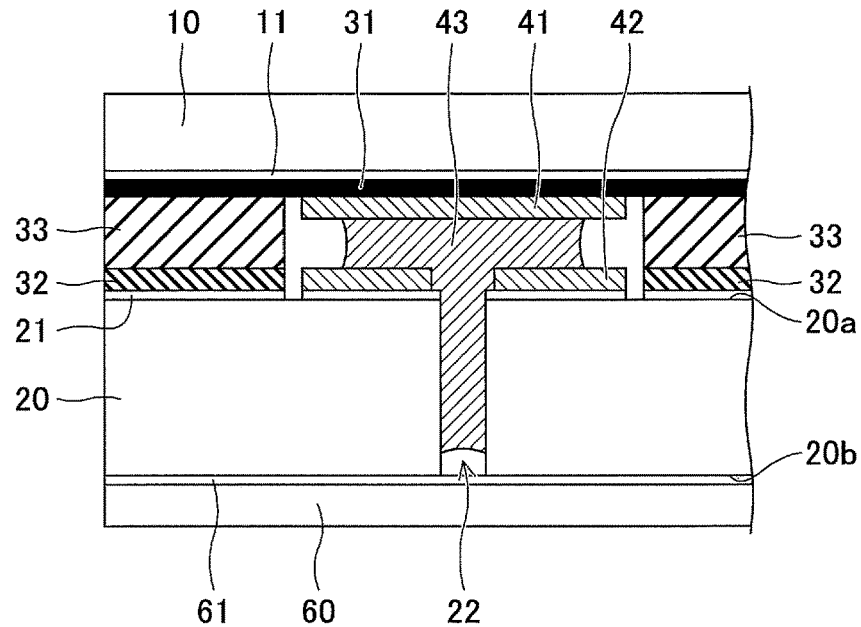
FIG. 9 is a diagram illustrating the touchscreen according to the first embodiment.

Alternatively, as depicted in FIG. 9, a transparent substrate 60 may be adhered to the second surface 20b with transparent adhesive tape 61. By this technique as well, it is possible to close the through hole 22. For example, a sheet of glass or a resin material such as polycarbonate may be used for the substrate 60.

Figure 10A:
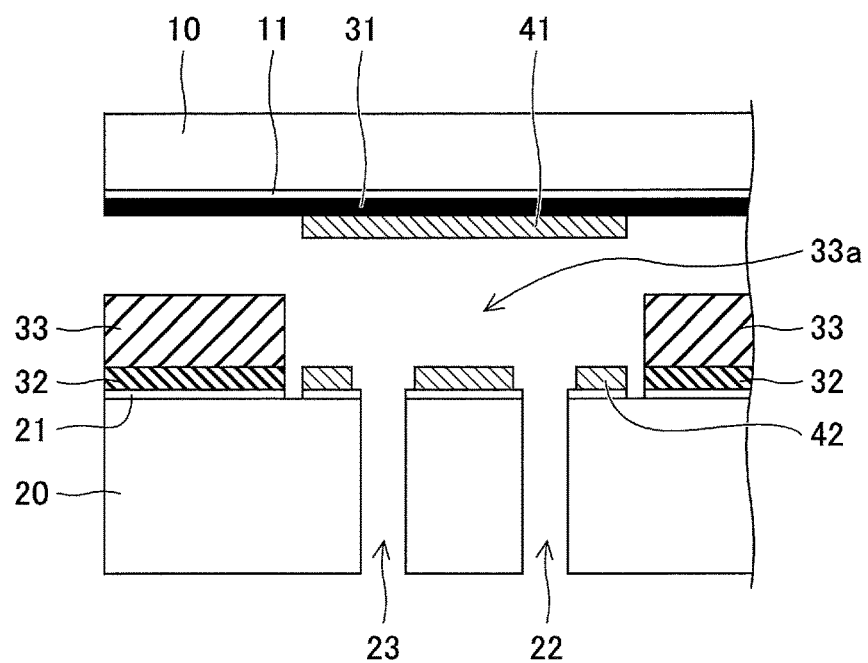
FIGS. 10A through 10C are diagrams illustrating the touchscreen according to the first embodiment.
Figure 10B:
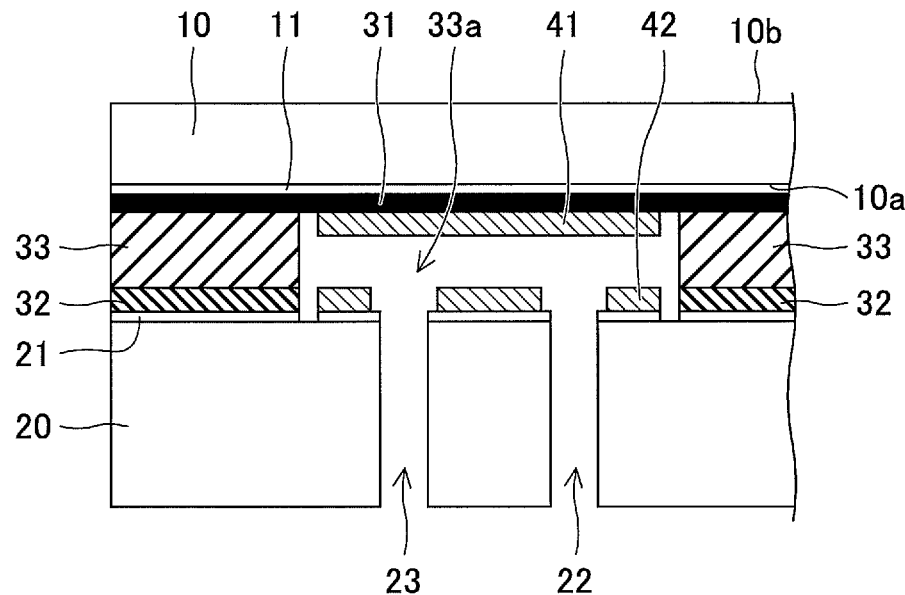
Figure 10C:
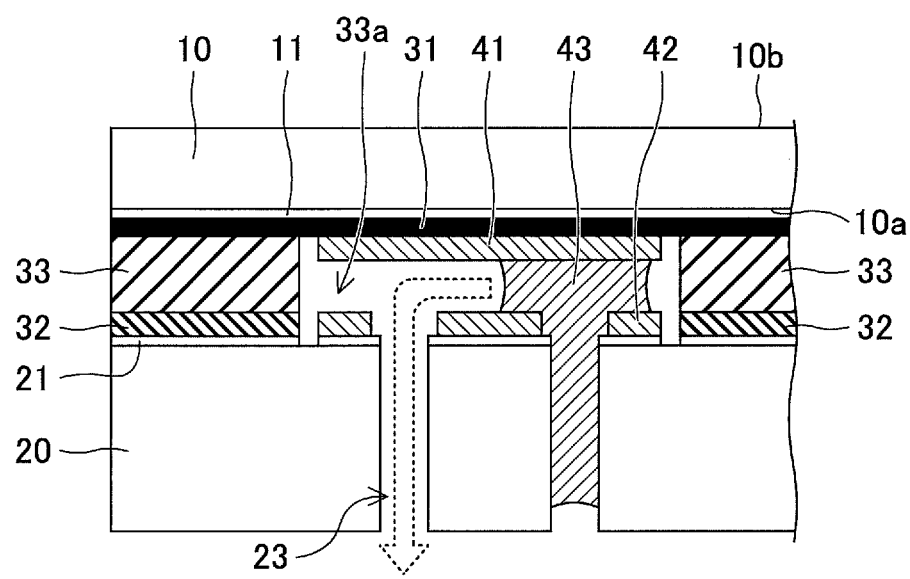

Furthermore, as depicted in FIGS. 10A through 10C, two through holes, namely, the through hole 22 and a through hole 23, may be provided in the lower substrate 20 over which the wiring connection region 40 is formed immediately below the wiring connection region 40 in FIGS. 10A through 10C. The through hole 23 is provided to release the air inside the opening 33a when the adhesive 43 is supplied into the opening 33a through the through hole 22.

Next, a method of manufacturing a touchscreen with two through holes according to this embodiment is described with reference to FIGS. 10A through 10C.

First, as depicted in FIG. 10A, the adhesive 33 in which the opening 33a is formed is adhered onto the insulator layer 32. The through holes 22 and 23 piercing through the lower substrate 20 are formed in a region of the lower substrate 20 over which the wiring layer 42 is formed. The through holes 22 and 23 are formed by a process such as laser processing or ultrasonic processing.

Next, as depicted in FIG. 10B, the first surface 10a of the upper substrate 10 over which the printing layer 31 is formed is adhered onto the adhesive 33 through the printing layer 31.

Next, as depicted in FIG. 10C, the adhesive 43 is supplied into the opening 33a through the through hole 22. The adhesive 43 supplied through the through hole 22 enters the opening 33a to connect the wiring layers 41 and 42. At this point, the air inside the opening 33a is pushed out through the through hole 23 as indicated by the dashed arrow in FIG. 10C. Therefore, the adhesive 43 can be smoothly supplied into the opening 33a without pushing the upper substrate 10. As a result, it is possible to prevent the flatness of the upper substrate 10 from being reduced.

Figure 11A:
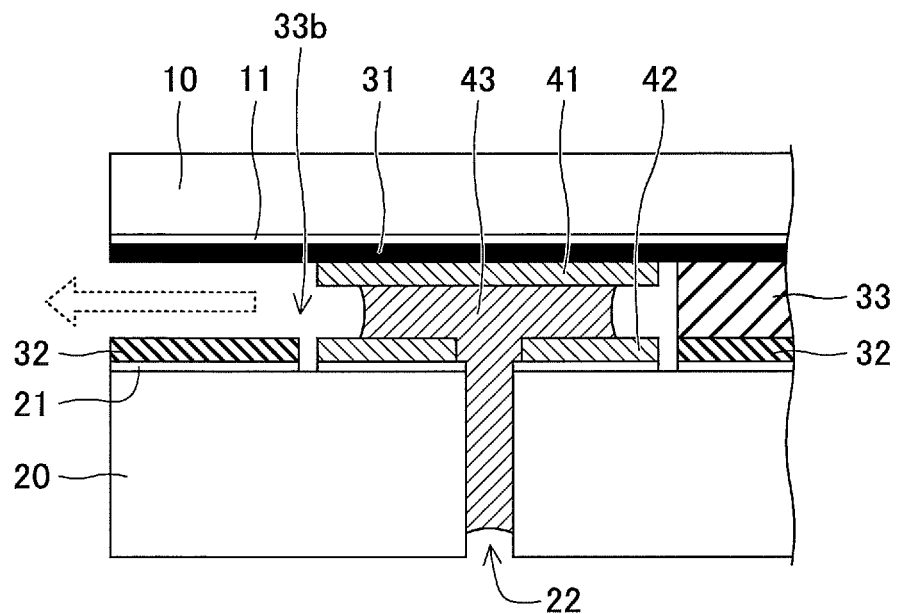
FIGS. 11A and 11B are diagrams illustrating the touchscreen according to the first embodiment.
Figure 11B:
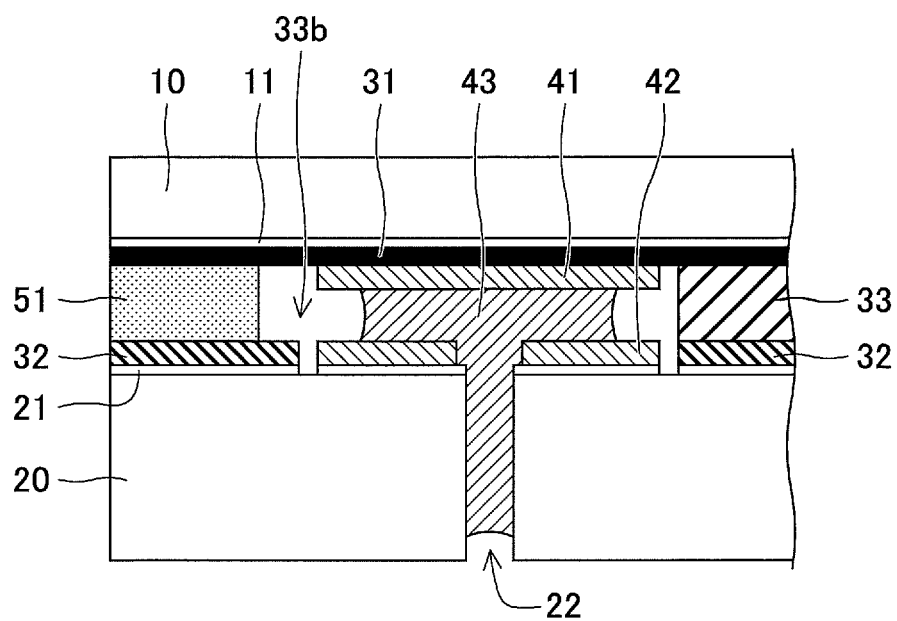

Alternatively, as depicted in FIG. 11A, it is possible to provide the adhesive 33 with an opening 33b that is open to the outside of the touchscreen. Because the opening 33b is open to the outside of the touchscreen, the air inside the opening 33b is pushed out of the touchscreen through the opening 33b when the adhesive 43 is supplied into the opening 33b through the through hole 22. After the adhesive 43 is supplied, an outer part of the opening 33b may be filled with a sealing 51 such as silicone to increase waterproofness as depicted in FIG. 11B.

Figure 12:
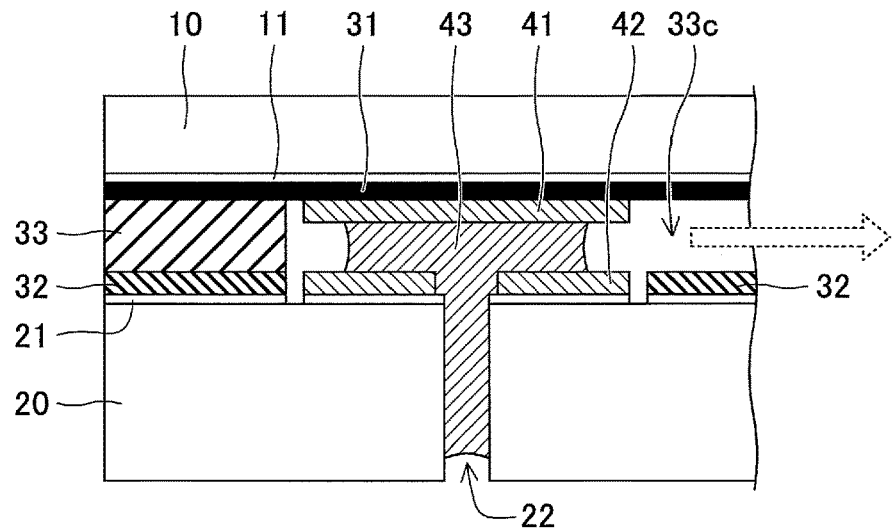
FIG. 12 is a diagram illustrating the touchscreen according to the first embodiment.

As yet another alternative, the adhesive 33 may be provided with an opening 33c that is open to the inside of the touchscreen. Because the opening 33c is open to the inside of the touchscreen, the air inside the opening 33c is pushed inward through the opening 33c when the adhesive 43 is supplied into the opening 33c through the through hole 22. According to the touchscreen depicted in FIG. 12, the adhesive 33 is provided outside the adhesive 43 to prevent entry of moisture from the outside, thus providing high waterproofness.

[b] Second Embodiment

Next, a second embodiment is described.

Touchscreens preferably have a large operation area operable as a touchscreen relative to the overall size. The operation area is also referred to as a transparent region, and the area outside the transparent region is referred to as a frame. The operation area may be increased by reducing the width of the frame.

Figure 13:
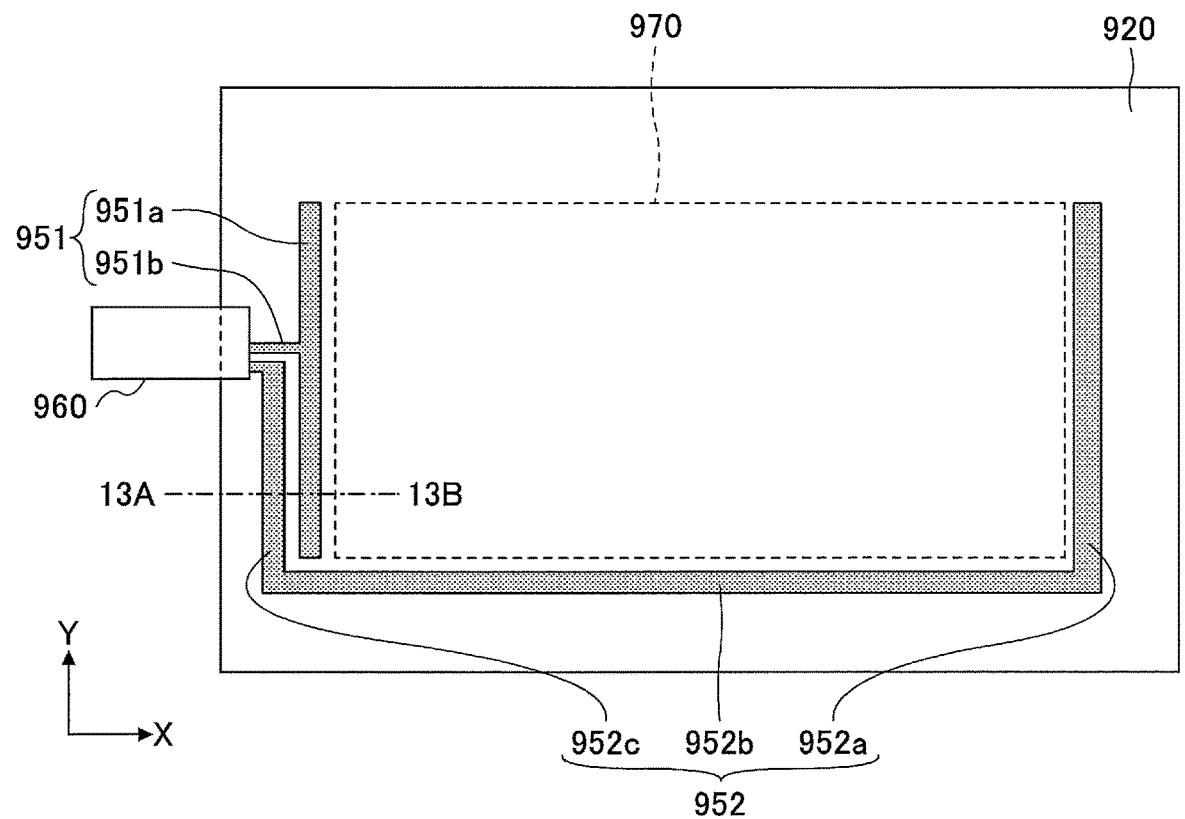
FIG. 13 is a diagram illustrating a structure of a lower substrate of a touchscreen.
Figure 14:
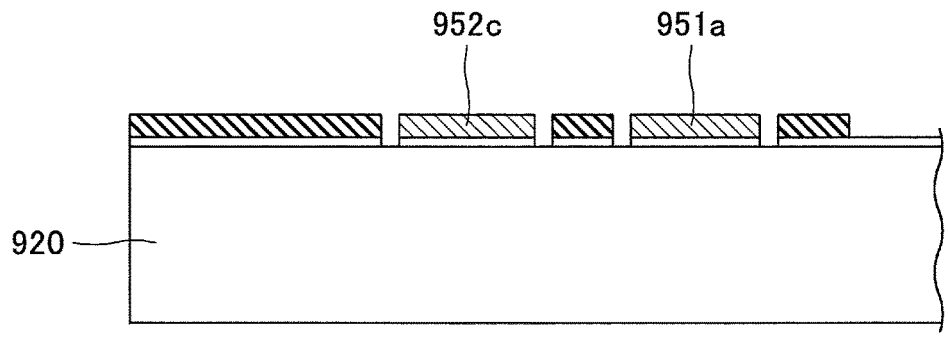
FIG. 14 is a cross-sectional view of part of the lower substrate of the touchscreen.

FIGS. 13 and 14 depict the lower substrate 920 of a touchscreen on which wirings are formed. FIG. 13 is a plan view of the lower substrate 920. FIG. 14 is a cross-sectional view of part of the lower substrate 920 taken along the chain line 13A-13B of FIG. 13.

According to the touchscreen as depicted in FIGS. 13 and 14, a potential distribution is generated in the X direction in the conductive film of the lower substrate 920, and a contact point is detected in the X direction by an upper substrate. Next, a potential distribution is generated in the Y direction in the conductive film of the upper substrate, and the contact point is detected in the Y direction by the lower substrate 920. Wirings 951 and 952 that generate a potential distribution in the X direction in the conductive film are formed on the lower substrate 920. Wirings that generate a potential distribution in the Y direction in the conductive film are formed on the upper substrate.

A printed board such as a flexible printed circuit (FPC) 960 is connected to the lower substrate 920. A voltage is supplied to the touchscreen via the FPC 960. The touchscreen has a rectangular shape, and the FPC 960 is connected to one side of the lower substrate 920 by thermocompression bonding. As depicted in FIG. 13, the wiring 951 is formed in a region of the lower substrate 920 near its first end in the X direction, and the wiring 952 is formed in a region of the lower substrate 920 near its second end in the X direction. The FPC 960 is connected to the lower substrate 920 on its left side.

The wiring 951 includes an electrode 951a and an interconnect 951b that connects the electrode 951a and an electrode of the FPC 960.

The wiring 952 includes an electrode 952a and interconnects 952b and 952c that connect the electrode 952a and the FPC 960. The interconnect 952b is connected to the electrode 952a and formed along an edge of the lower substrate 920 in the X direction. The interconnect 952c connects the interconnect 952b and an electrode of the FPC 960, and is formed along the Y direction. The electrode 952a is formed near a side of the lower substrate 920 that is opposite from the side to which the FPC 960 is connected. Furthermore, in the left-end region of the lower substrate 920, the electrode 951a and the interconnect 952c are formed in parallel as depicted in FIG. 14 to increase the width of the frame, thus reducing an operation area 970 as indicated by the dashed line in FIG. 13.

Figure 15:
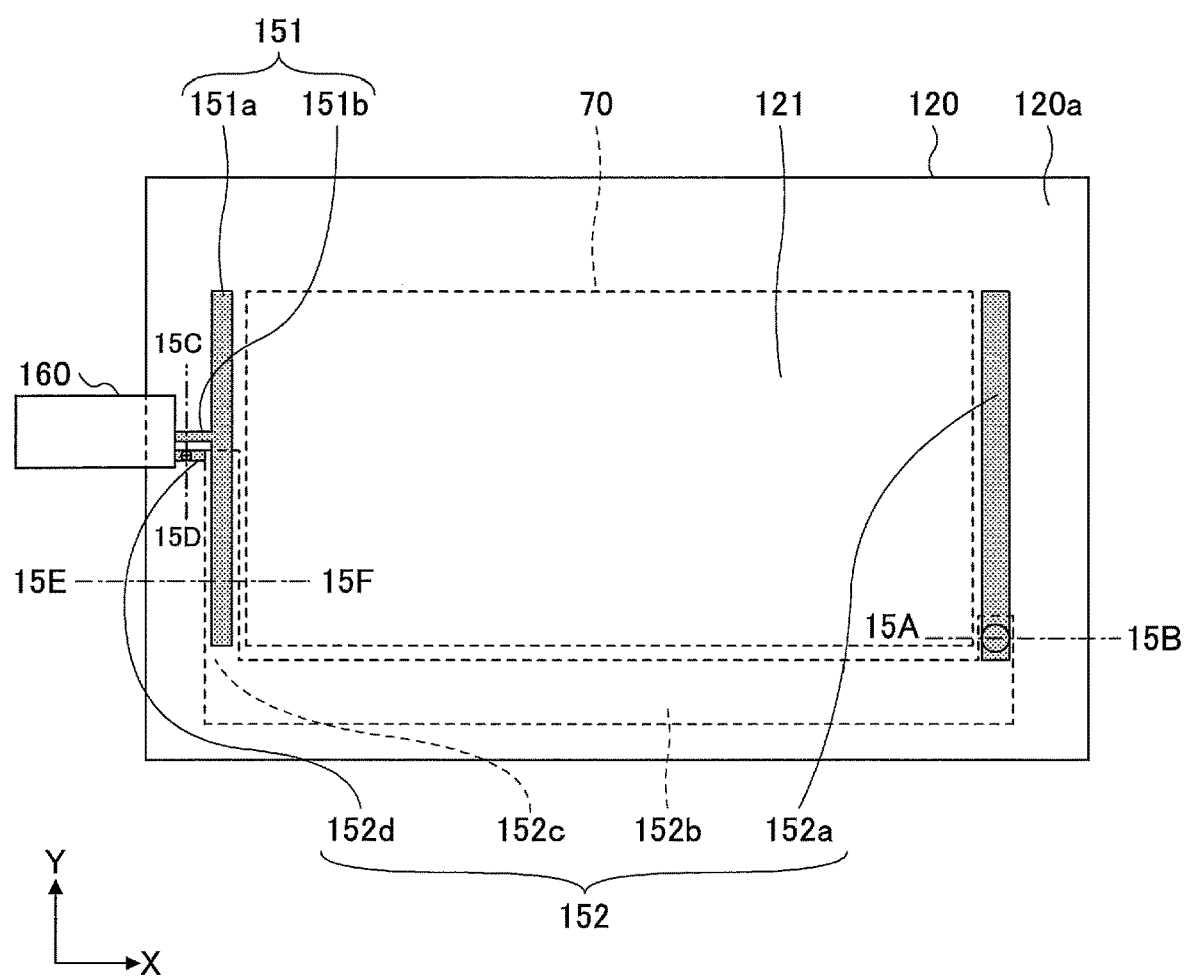
FIG. 15 is a diagram illustrating a lower substrate of a touchscreen according to a second embodiment.
Figure 16:
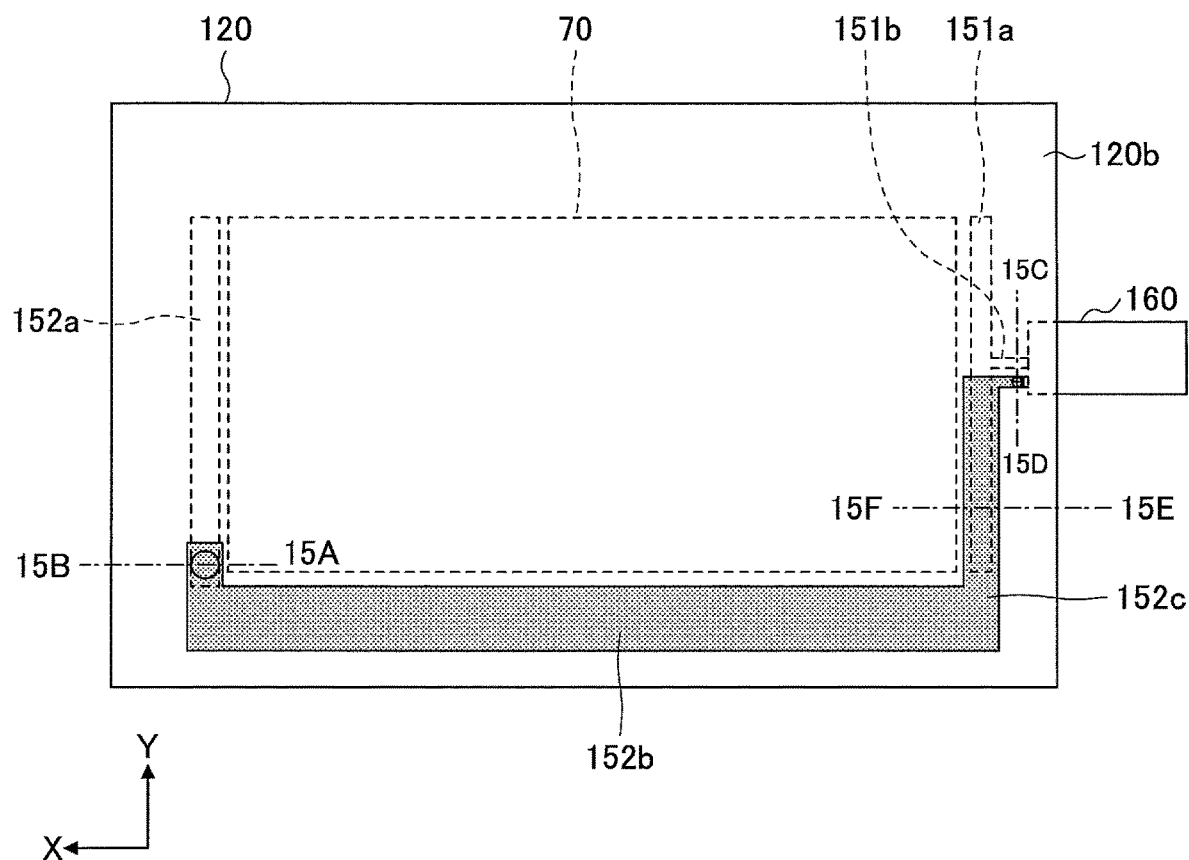
FIG. 16 is a diagram illustrating the lower substrate of the touchscreen according to the second embodiment.
Figure 17A:
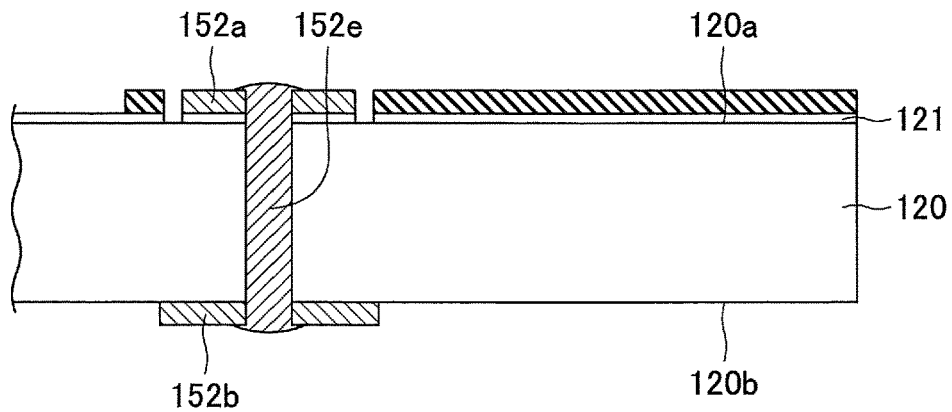
FIGS. 17A through 17C are diagrams illustrating the lower substrate of the touchscreen according to the second embodiment.
Figure 17B:
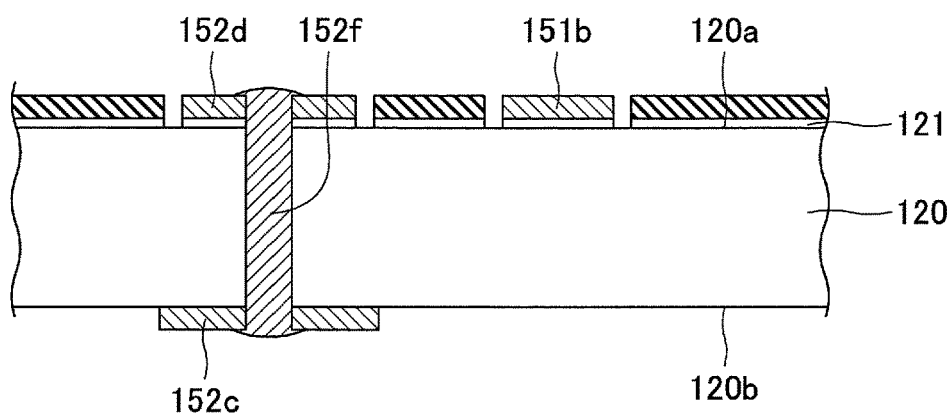
Figure 17C:
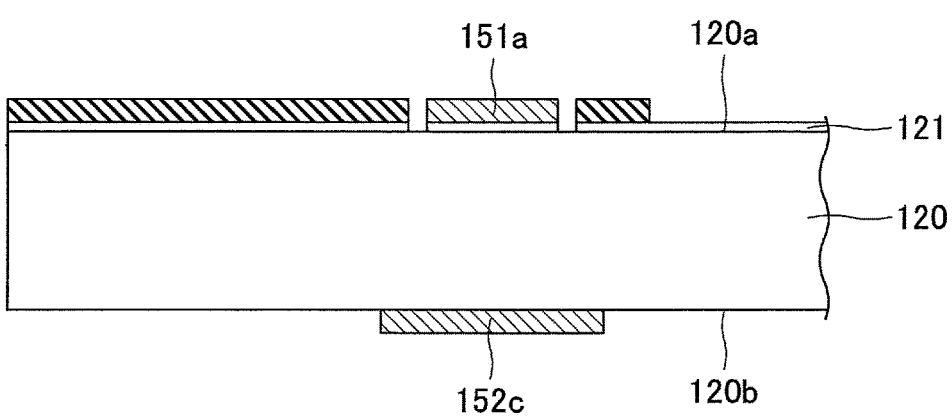

Next, a touchscreen according to the second embodiment is described with reference to FIGS. 15, 16 and 17A through 17C. FIG. 15 is a plan view of a lower substrate 120 of the touchscreen. FIG. 16 is a bottom view of the lower substrate 120. FIG. 17A is a cross-sectional view of the lower substrate 120, taken along the chain line 15A-15B of FIGS. 15 and 16. FIG. 17B is a cross-sectional view of the lower substrate 120, taken along the chain line 15C-15D of FIGS. 15 and 16. FIG. 17C is a cross-sectional view of the lower substrate 120, taken along the chain line 15E-15F of FIGS. 15 and 16.

According to this embodiment, the touchscreen has a rectangular shape, and a wiring 151 and a wiring 152 that generate a potential distribution in the X direction are formed on the lower substrate 120. An FPC 160 is connected to the side of the lower substrate 120 on which side the wiring 151 is formed, namely, the left side of the lower substrate 120 in FIG. 15, by thermocompression bonding.

The wiring 151 is formed over the top surface 120a of the lower substrate 120, and includes an electrode 151a and an interconnect 151b that connect the electrode 151a and the FPC 160.

The wiring 152 includes an electrode 152a and interconnects 152b, 152c, and 152d that connect the electrode 152a and the FPC 160. The interconnect 152b is connected to the electrode 152a and formed along an edge of the lower substrate 120 in the X direction. The interconnect 152c is connected to the interconnect 152b and formed along the Y direction. The interconnect 152d connects the interconnect 152c and an electrode of the FPC 160.

According to this embodiment, the electrode 152a and the interconnect 152d are formed over the top surface 120a, and the interconnects 152b and 152c are formed on the bottom surface 120b. The electrode 152a and the interconnect 152b are connected by a via 152e that pierces through the lower substrate 120 as depicted in FIG. 17A. The interconnect 152c formed on the bottom surface 120b and the interconnect 152d formed on the top surface 120a are connected by a via 152f that pierces through the lower substrate 120 as depicted in FIG. 17B. According to this embodiment, as depicted in FIGS. 15 and 17C, it is possible to form the interconnect 152c on the opposite side of the lower substrate 120 from the electrode 151a near the connection of the lower substrate 120 and the FPC 160. Therefore, according to this embodiment, compared with FIG. 13, the width of the frame is reduced, and thus an operation area 70 of the touchscreen can be increased as indicated by the dashed line in FIGS. 15 and 16.

[c] Third Embodiment

Figure 18:
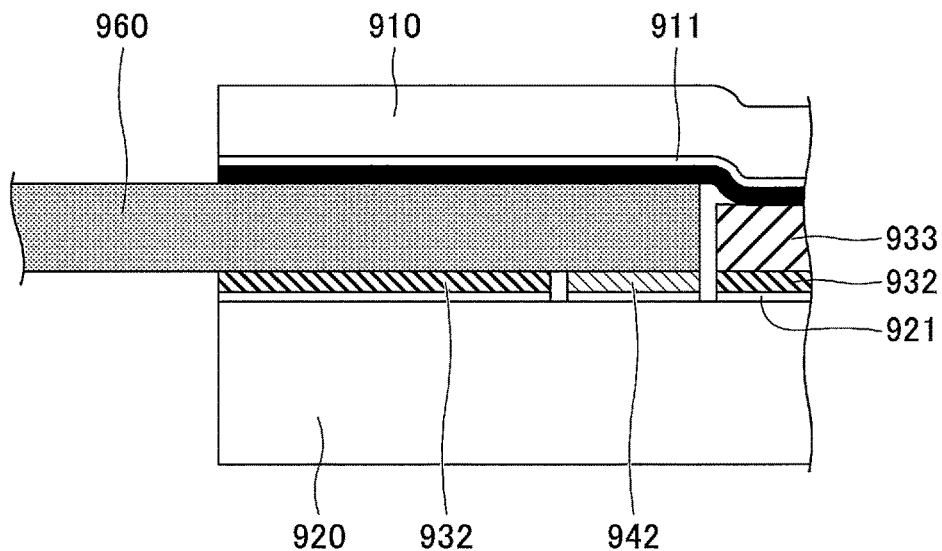
FIG. 18 is a cross-sectional view of a region of a touchscreen to which a flexible printed circuit is connected.

Next, a third embodiment is described. Referring to FIG. 18, the FPC 960 is connected to a surface of the lower substrate 920 that faces toward the upper substrate 910, and is sandwiched between the upper substrate 910 and the lower substrate 920. While the lower substrate 920 and the upper substrate 910 are stuck together by the adhesive 933, the FPC 960 is thicker than the adhesive 933. Therefore, as depicted in FIG. 18, the upper substrate 910, which is flexible, flexes between the FPC 960 and the adhesive 933, thus impairing the aesthetic appearance of the touchscreen. Furthermore, if moisture enters the touchscreen along the FPC 960, the wiring layer 942 connected to the FPC 960 by thermocompression bonding may be short-circuited to damage functions of touchscreen.

Figure 19:
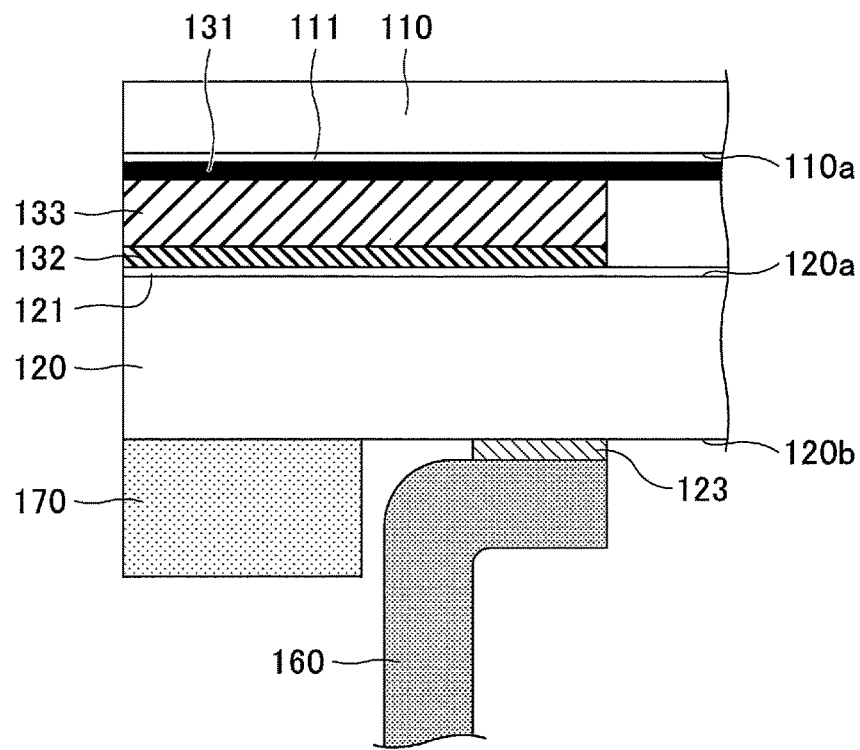
FIG. 19 is a cross-sectional view of a touchscreen according to a third embodiment.

A touchscreen according to the third embodiment is described with reference to FIG. 19. A transparent conductive film 111 is formed on a surface 110a of an upper substrate 110, and a transparent conductive film 121 is formed on the top surface 120a of the lower substrate 120. A decorative printing layer 131 is formed on the conductive film 111, and an insulator layer 132 is formed on the conductive film 121. The upper and lower substrates 110 and 120 are adhered to each other with an adhesive 133 with the conductive films 111 and 121 facing toward each other. A gap commensurate with the thickness of the adhesive 133 is formed between the conductive films 111 and 121.

A wiring layer is formed over each of the upper substrate 110 and the lower substrate 120. According to this embodiment, while the wiring layer of the upper substrate 110 is formed in a marginal area of the surface 110a, the wiring layer of the lower substrate 120 is formed on each of the top surface 120a and the bottom surface 120b, and the wiring layer on the top surface 120a and the wiring layer on the bottom surface 120b are connected by a via, the same as in the second embodiment. The wiring layer of the upper substrate 110 and the wiring layer of the lower substrate 120 may be connected by an electrically conductive adhesive in the same manner as depicted in FIG. 2 or FIG. 6. The third embodiment is different from the second embodiment in that interconnects for establishing electrical connection with the FPC 160 concentrate on the bottom surface 120b of the lower substrate 120.

According to the touchscreen of this embodiment, the FPC 160 is connectable to a wiring layer 123 formed on the bottom surface 120b. Accordingly, the FPC 160 is not sandwiched between the upper and lower substrates 110 and 120. Therefore, the flexure of the upper substrate 110 is prevented, and thus, the aesthetic appearance of the touchscreen is not impaired.

In addition, an adhesive 170 such as waterproof double-sided tape for adhering the touchscreen to an image display unit may be adhered to the bottom surface 120b. By adhering the touchscreen to the image display unit with the adhesive 170, it is possible to prevent moisture or the like from entering the wiring layer 123 to which the FPC 160 is connected.

In other respects than those described above, the third embodiment may be the same as the second embodiment. Furthermore, the touchscreen of the second embodiment may include the upper substrate 110, the conductive film 111, the printing layer 131, the insulator layer 132, the adhesive 133, and an electrically conductive adhesive in the same manner as the touchscreen of the third embodiment.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention. For example, two or more of the above-described embodiments may be suitably combined.

What is claimed is:

1. A touchscreen, comprising:
   a first substrate having a first transparent conductive film formed on a surface of the first substrate, and having a colored printing layer formed on the first transparent conductive film;
   a second substrate having a second transparent conductive film formed on a surface of the second substrate facing the first transparent conductive film, and having an insulator layer formed on the second transparent conductive film;
   an adhesive directly contacting the colored printing layer in a marginal area of the first substrate and the insulator layer in a marginal area of the second substrate to adhere the colored printing layer and the insulator layer to each other, with an opening provided in the adhesive between the first substrate and the second substrate, the opening forming a wiring connection region;
   a first wiring layer formed on the colored printing layer over the surface of the first substrate;
   a second wiring layer formed on the second conductive transparent film over the surface of the second substrate;
   at least two through holes piercing through the second substrate toward the opening; and
   an electrically conductive adhesive that is provided in a space between the first wiring layer and the second wiring layer in the opening through one of the through holes, and connects the first wiring layer and the second wiring layer at the wiring connection region,
   wherein a surface of the adhesive facing the opening is out of contact with the electrically conductive adhesive.

2. The touchscreen as claimed in claim 1, wherein the colored printing layer is formed over the marginal area of the first substrate, and
   the adhesive, the first wiring layer, the second wiring layer, and the electrically conductive adhesive are covered with the colored printing layer and invisible from a touchscreen surface.

3. A touchscreen, comprising:
   a first substrate having a first transparent conductive film formed on a surface of the first substrate, and having a colored printing layer formed on the first transparent conductive film;
   a second substrate having a second transparent conductive film formed on a surface of the second substrate facing the first transparent conductive film, and having an insulator layer formed on the second transparent conductive film;
   an adhesive directly contacting the colored printing layer in a marginal area of the first substrate and the insulator layer in a marginal area of the second substrate to adhere the colored printing layer and the insulator layer to each other, with an opening provided in the adhesive between the first substrate and the second substrate, the opening forming a wiring connection region;
   a first wiring layer formed on the colored printing layer over the surface of the first substrate;
   a second wiring layer formed on the second conductive transparent film over the surface of the second substrate;
   a through hole piercing through a portion of the second substrate where the opening is provided; and
   an electrically conductive adhesive that is provided in a space between the first wiring layer and the second wiring layer through the through hole, and connects the first wiring layer and the second wiring layer at the wiring connection region,
   wherein the opening has a first end open to an outside of the touchscreen at a side surface of the touchscreen and a second end opposite to the first end and closed by the adhesive, or the opening has a first end open to an inside of the touchscreen in a direction parallel to the surface of the second substrate and a second end opposite to the first end and closed by the adhesive.

4. The touchscreen as claimed in claim 3, further comprising:
   a sealing that fills an outer portion of the opening that is open to the outside of the touchscreen.

5. The touchscreen as claimed in claim 3, wherein the side surface of the touchscreen is perpendicular to a surface of the second substrate at which the through hole is open.

6. A touchscreen, comprising:
   a first substrate having a first transparent conductive film formed on a surface of the first substrate, and having a colored printing layer formed on the first transparent conductive film;
   a second substrate having a second transparent conductive film formed on a surface of the second substrate facing the first transparent conductive film, and having an insulator layer formed on the second transparent conductive film;
   an adhesive directly contacting the colored printing layer in a marginal area of the first substrate and the insulator layer in a marginal area of the second substrate to adhere the colored printing layer and the insulator layer to each other, with an opening provided in the adhesive between the first substrate and the second substrate, the opening forming a wiring connection region;
   a first wiring layer formed on the colored printing layer over the surface of the first substrate;
   a second wiring layer formed on the second conductive transparent film over the surface of the second substrate;
   at least two through holes piercing through the second substrate toward the opening; and
   an electrically conductive adhesive that is provided in a first space and absent in a second space between the first wiring layer and the second wiring layer in the opening through one of the through holes, and connects the first wiring layer and the second wiring layer at the wiring connection region, the second space being different from the first space and formed between the adhesive and the electrically conductive adhesive.

* * * * *